United States Patent [19]

Hawwass et al.

[11] 4,321,673

[45] Mar. 23, 1982

[54] ELECTRONIC GAME

[76] Inventors: Ebrahim Hawwass, 2204 Chapman Dr.; Hassan Hawwass, 1317 Exley Ave., both of Las Vegas, Nev. 89104; John Nassif, 2314 Union Ave., Altoona, Pa. 16602; Victor A. Cajal, 602 Shannon Ave., Melbourne Beach, Fla. 32951; Kenneth T. Krone, 2727 E. Oakland Park Blvd., Fort Lauderdale, Fla. 33306

[21] Appl. No.: 114,449

[22] Filed: Jan. 22, 1980

[51] Int. Cl.[3] ........................ A63B 71/00; G06F 15/28

[52] U.S. Cl. ........................................ 364/412; 273/1 E; 273/138 A; 364/410

[58] Field of Search ............... 364/410, 412, 717, 565; 273/142 R, 142 B, 142 E, 142 H, 142 HA, 274, 280, 283, 1 E, 138 A; 340/724, 725, 753–755, 781, 380, 384 R, 384 E

[56] References Cited

U.S. PATENT DOCUMENTS

| | | | |
|---|---|---|---|
| 3,417,995 | 12/1968 | Creely | 273/138 A |
| 3,710,379 | 1/1973 | Bruinsma | 340/380 |
| 3,819,186 | 6/1974 | Hinterstocker | 273/138 A |
| 4,060,242 | 11/1977 | Huang et al. | 273/138 A |

OTHER PUBLICATIONS

"Electronic Wheel of Fortune", Popular Electronics, Oct. 1975, pp. 69–70.

Edwards; "An Electronic Roulette Wheel"; Electronics Australia, vol. 37, No. 11, pp. 46–51; Feb. 1976.

*Primary Examiner*—Errol A. Krass

*Attorney, Agent, or Firm*—Jay M. Cantor

[57] ABSTRACT

An electronic game is housed in an enclosure that is free-standing and accessible by many players or in a structure suitable for one player.

The game duplicates much of the sight and sound associated with conventional roulette. One embodiment includes a circular matrix of light emitting diodes (LEDs) of red and green color that provides for the simulation of the roulette wheel by circulating the fixed numerical sequence of a standard roulette wheel in "marquee" fashion. The roulette ball is duplicated by a circle of lights just outside of the aforementioned circular number matrix. Sounds of the roulette ball spinnings are electronically generated and reproduced by a loudspeaker.

The player is allowed to electronically "spin" the wheel and electronically "spin" the ball at the start of each game. An automatic mode is provided wherein the game automatically spins the ball and wheel at varying speeds. Number selections or the like are accepted at the start of each spin sequence, and up until a certain time, whereafter, no more selections are taken. Thus, as in conventional roulette, the ball and wheel are in motion before the player is required to make a selection.

The selection surface is controlled by the game computer and can accept any of the over 100 selections allowed in roulette. Multiple selections per number are allowed as are multiple number selections. All control of the "wheel", "ball", selection surfaces, sounds and bonuses is by the game computer.

19 Claims, 8 Drawing Figures

ELECTRONIC GAME

BACKGROUND OF THE INVENTION

1. Field of the Invention

This invention relates to electronic games and, more specifically, to an electronic roulette-type game having substantially no moving parts and providing all of the aspects of the well known roulette-type game of chance.

2. Description of the Prior Art

Games of chance have been well known in the prior art and have found huge success, especially in certain areas where gambling has been rendered legal. Such games of chance have also been provided for home enjoyment. Games of chance of the prior art have been both of the mechanical variety and, in recent years, electronic in nature as well. One of the prior art games of chance which has found great acceptance by the public has been a roulette-type of game. Such games according to the prior art have always been mechanical and required that a wheel be spun in a first direction and a ball rolled along a race in another direction with the ball finally dropping down from the race into a slot when the angular velocity of the ball relative to the wheel dropped to a point wherein the outward forces on the ball were insufficient to retain the ball in the race. These prior art machines or games required machine operators and were subject to the problems inherent in the use of human operators.

SUMMARY OF THE INVENTION

In accordance with the present invention, there is provided an electronic game in the form of a roulette-type device wherein human operators are not required and the effects encountered in normal roulette game play are provided. In addition, visual devices and techniques as well as audible devices to provide the voice of a human operator are made available. Briefly, a salient feature of the game is that the player is allowed to electronically "spin" the wheel and electronically "spin" the ball at the start of each game. An automatic mode is provided wherein the game automatically spins the ball and wheel at varying speeds. Number selections or the like are accepted at the start of each spin sequence, and up until a certain point, whereafter, no more selections are taken. Players who have not deposited a check in making a selection automatically (and immediately) have their check refunded. An indicator of how much time is left to make a selection is part of the game. Thus, as in conventional roulette, the ball and wheel are in motion before the player is required to make a selection.

BRIEF DESCRIPTION OF THE DRAWINGS

FIG. 3 is an enlarged view of the section 3—3 of FIG. 2;

DESCRIPTION OF THE PREFERRED EMBODIMENT

Figure 1:
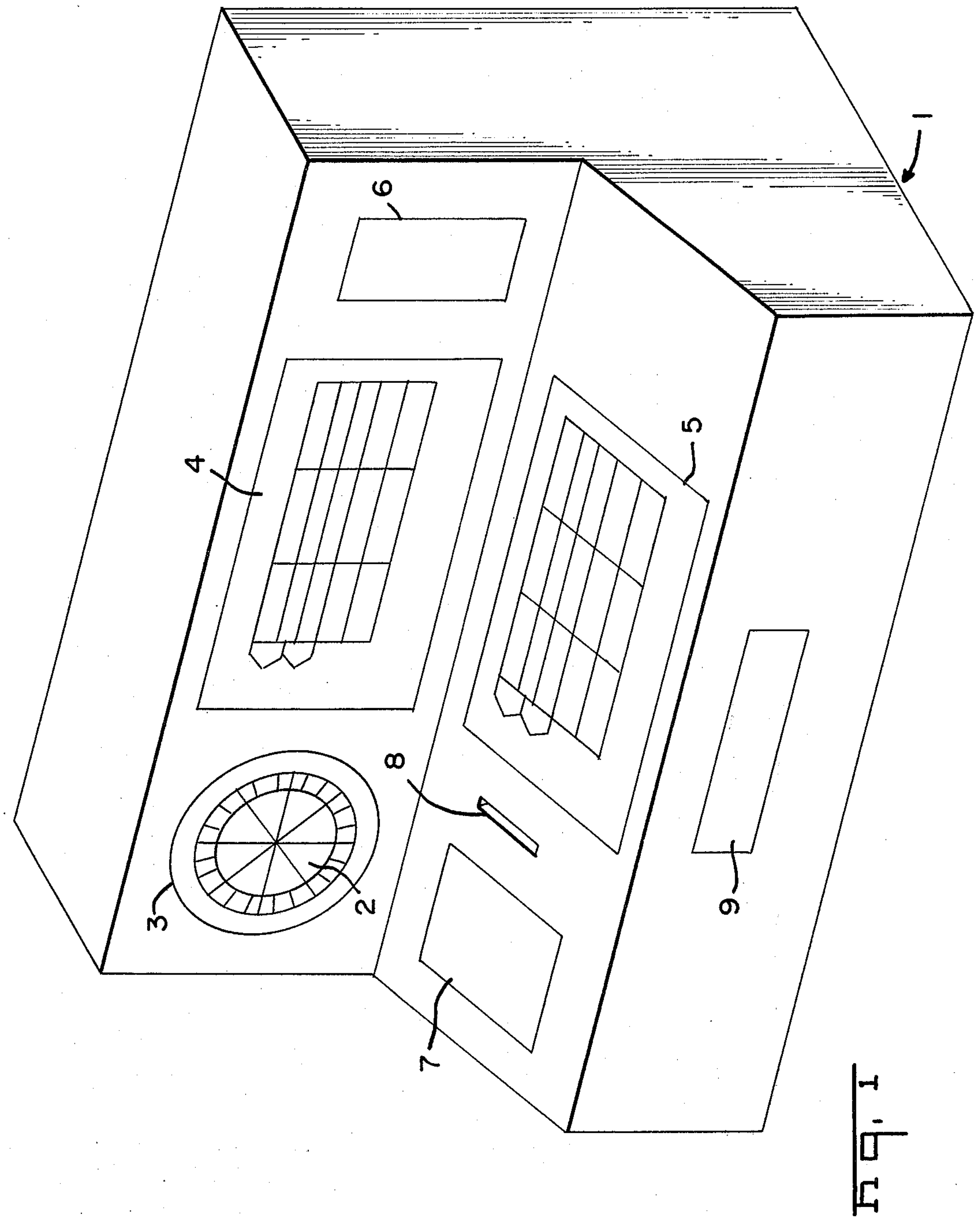
FIG. 1 is a front view of a single player version of an electronic roulette-type game in accordance with the present invention.

A drawing of one embodiment of the single player game in accordance with the invention is shown in FIG. 1. The game 1 includes the roulette wheel representation 2, a ball representation 3, a representation of the roulette number selection layout 4, yet another representation of the roulette number selection layout 5, a message panel 6, a control panel 7, a coin slot 8 and a bonus slot 9. As will be seen later, the function of the number selection layout representations 4 and 5 could be combined into the layout representation 4 or 5, but since the layout representation serves two functions, the discussion will assume the two separate layout representations as shown in FIG. 1. A detailed description of each of the components 2 thru 9 in FIG. 1 follows.

ROULETTE WHEEL REPRESENTATION 2

Figure 2:
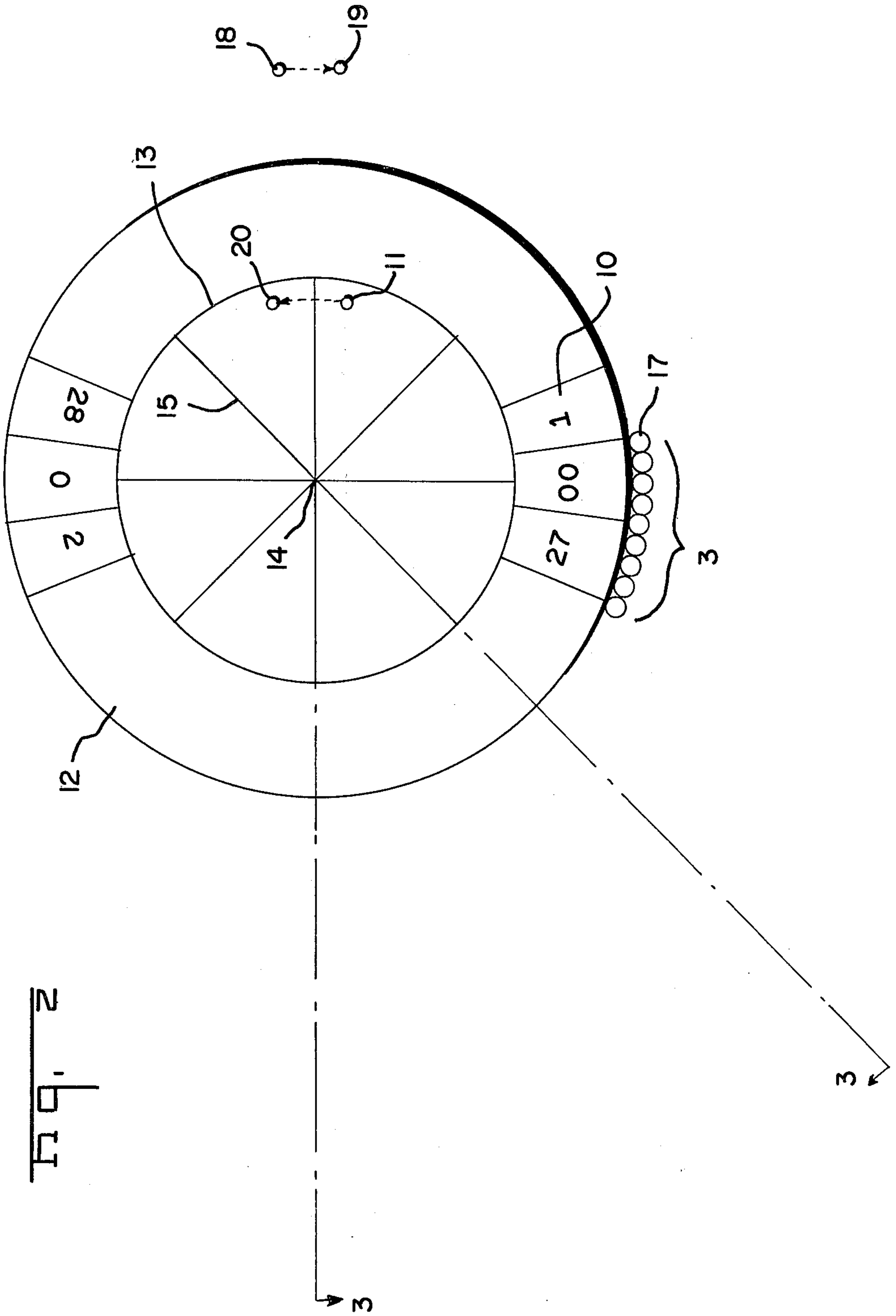
FIG. 2 is an enlarged view of the simulated roulette wheel of FIG. 1.
Figure 7:
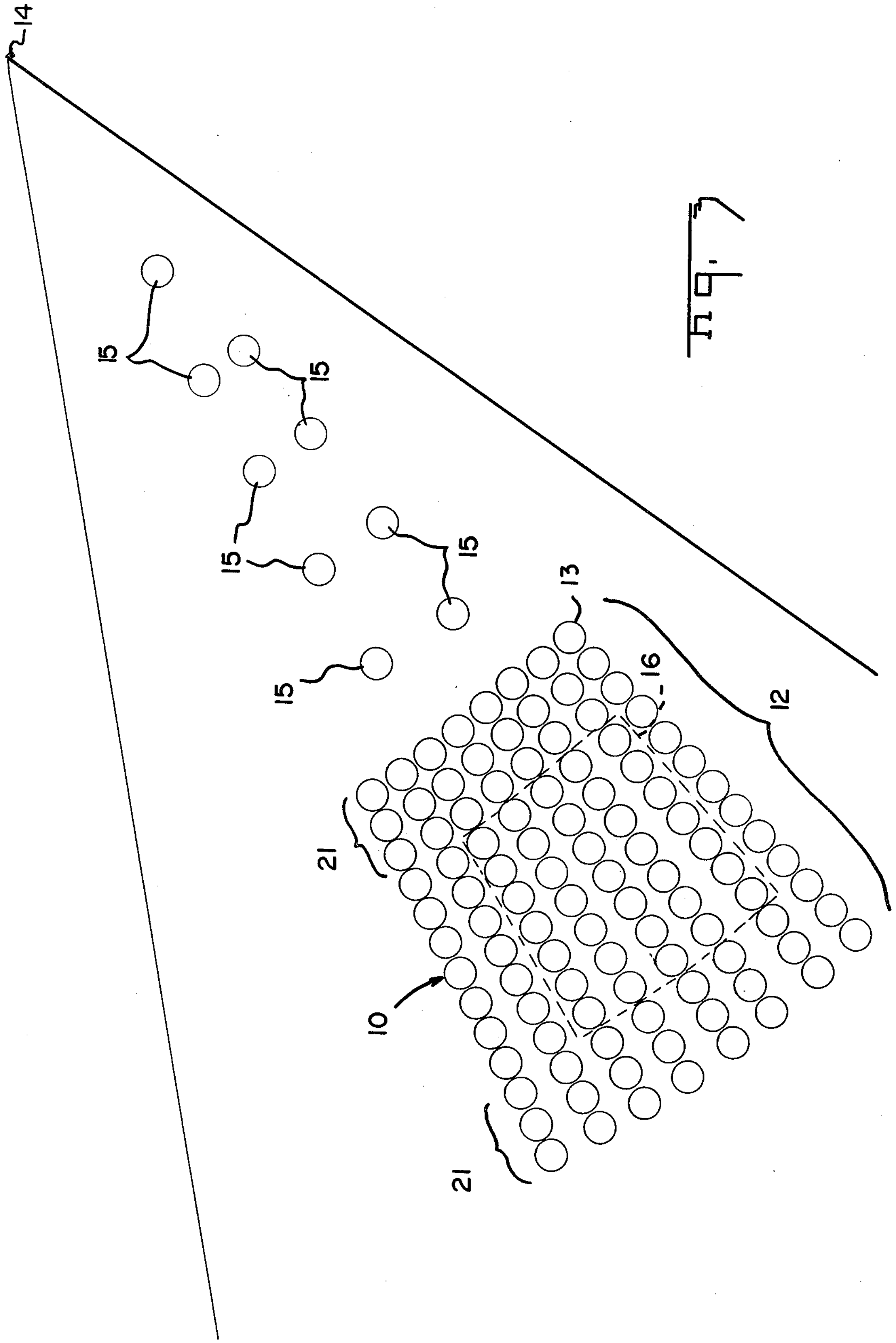

FIG. 2 shows an enlarged view of the roulette wheel representation 2 and ball representation 3. The roulette wheel representation 2 consists of a matrix of light emitting diodes (LEDs) 10 (FIG. 3) forming a circular ring 12. These particular LEDs 10 are of the type that emit either red light or green light or nothing depending upon the polarity and magnitude of the applied voltage. Continuing the matrix from the inside of the annular ring 13 to the center 14 of the wheel representation are also LEDs 15 (FIG. 3). These are of the type that emit yellow light when voltage is applied. Also the packing density of these LEDs 15 is not as great as the LEDs 10 in the annular ring. A section of the wheel representation of FIG. 2 is expanded to form FIG. 3. The yellow LEDs 15 and the red/green LEDs 10 lie on a radial line through the center 14 of the wheel representation as shown in FIG. 3.

The density of red/green LEDs 10 in the annular ring 12 is such that a number can be formed by the proper lighting of the LEDs. Usually a $5\times7$ matrix 16 is sufficient for a number to be formed. Three additional rows 21 above and three below the number field are added making a total of a $5\times13$ matrix required to form a number. A number may also be formed by not lighting those particular LEDs that form a number and lighting all LEDs surrounding them. This has the effect of making a "black" number appear. Thus, red, green and black numbers are all available.

By applying proper voltage to certain LEDs 10, a number is formed in a selected sector in the annular ring 12 portion of the wheel representation. Furthermore, since any LED 10 can be red, green or off (black) any particular pocket can be simulated as in conventional roulette.

A conventional roulette wheel is divided into 8 equal sections by ribs along the radials of the wheel. The yellow LEDs 15 perform this function.

Under control of the game computer 31 (FIG. 5), the various LEDs are controlled to provide a moving display of red, green, and black numbers simulating the motion of the wheel 2 via ring 12. The moving display is similar to a "marquee" display, except in this instance the "marquee" is bent and curved and joined end-to-end to form an annular ring.

The initial "speed" of the wheel is either controlled by the player or automatically by the computer 31. The operation thereof is discussed below.

ROULETTE BALL REPRESENTATION 3

In FIG. 2, surrounding the perimeter of the annular matrix of LEDs 12 is a ring of incandescent lamps 17 (or yellow LEDs) that simulate the ball and motion of the ball. Only one incandescent lamp 17 is on at one time and the computer 31 sequentially lights the next lamp 17 to simulate ball movement. The initial "speed" of the ball is controlled either by the player or automatically by the computer 31. This is described below.

BALL AND WHEEL INITIAL SPEED CONTROL

A particular embodiment of ball and wheel speed control is described below:

Four sets of a combination of an infrared (IR) photo detector (not shown) and IR source (not shown) are used for ball and wheel speed control. In FIG. 2, two ball speed control pairs 18 and 19 and two wheel speed control pairs 11 and 20 are placed within easy reach of the player. The ball and wheel are spun in opposite directions. Since the IR photo detector and IR source 18 are facing the player, no energy from the source is detected by the detector. If a finger were placed over the pair 18 then some IR energy would be reflected off of the player's finger onto the photo detector. Thus, if a player were to first slide his finger past source/detector pair 18 and then subsequently with the same motion past source/detector pair 19, a signal first from detector 18 and then from detector 19 would be received by the computer 31. The time difference between these two signals depends upon how fast the player's finger moves from pair 18 to pair 19.

If the time it takes for the player's finger to move from pair 18 to pair 19 is $\Delta t$, since the angular distance between pair 18 and pair 19 is a known quantity, $\theta$, then the angular speed of the players finger is given by $$\omega_F = \theta/\Delta t$$

Where $\omega_F$ = finger angular velocity $\theta$ = angular distance between two sets of source detector pairs $\Delta t$ = time it takes player's finger to traverse.

This is precisely the same angular velocity that would have been imparted to a real ball on a conventional roulette wheel. Note that the only direction allowed for the ball is clockwise. Finger motion in the other direction is ignored by the computer 31. This value of initial ball velocity $\omega_{oB}$ is what is used in the "ball speed algorithm" described below. It has been determined by experiment that a close approximation to the speed of a roulette ball as a function of time up until the ball falls into a pocket is given by $$\omega_B = \omega_{oB} e^{-at} \quad (1)$$

Where $\omega_B$ = ball speed at $t \geqq 0$ $\omega_{oB}$ = initial speed of ball at $t=0$ a = deceleration constant.

There exists a critical angular velocity, after which a real roulette ball is no longer travelling around the outside of the roulette wheel and starts its fall into the wheel and subsequently into the winning pocket. Thus there is a critical time $t_c$ at which the ball starts to fall which is: $t_c = -1/a \ln \omega_c/\omega_{oB}$, where ln denotes the natural logarithm. Since $\omega_c$ is a constant of the physics of a conventional roulette wheel, a representative value can be determined. This value does not change and is considered a constant.

$\omega_{oB}$ is the initial velocity, determined previously by how fast the player moves his finger past the 2 IR sources/detector configurations 18, 19, "a", the deceleration constant, is a number determined from conventional roulette wheels.

The computer 31, therefore can, given the initial velocity imparted to the ball, generate the time from that moment when the ball will fall given equation (1). At any time, 5, equation (1) allows the computer to determine how fast the ball should be going. Integration of equation (1) gives $$\theta_B = \omega_{oB}/a(1-e^{-at}) \quad (2)$$

which is the angular ball position at any time $t \geqq 0$. Thus all is known about where the ball should be, given the initial velocity imparted to the ball by the player.

In order to prevent a player from somehow manipulating the initial velocity to be the same or known in the equation, either $\omega_{oB}$ has a small random additive variation or the value of "a" can be minutely randomly altered. This simulates the situation in real mechanical roulette wheels.

A similar situation exists with the wheel except the equation of motion for the wheel is simple due to smaller frictional forces acting on it (a roulette wheel normally rides on a low friction bearing).

The angular velocity at any time is given by $$\omega_w = \omega_{ow} - bt \quad (3)$$

for $$t \geqq 0,\ t > \omega_o/b$$

and the angular position at any time is given by the integral of equation (3)

$$\theta_w = \omega_{ow} t - bt^2/2 + c$$

where b is a deceleration constant of the wheel approximating that of a mechanical roulette wheel. Thus, all is known about where the wheel should be, given the initial velocity imparted to the wheel by the player.

Again as in equation (1) or (2), a random small time value is added to "$\omega_{ow}$" or "(b)". The small random additional value in equation (1), (2) or (3) is of the order of one or two revolutions of the wheel.

It is then a matter of the computer 31 calculating where the ball and wheel are at the time the ball reaches the critical angular velocity $\omega_c$.

In addition to the random nature of the algorithm, the computer can calculate a random "bounce" factor which simulates the bouncing of the roulette ball from pocket to pocket before coming to rest. The bounce factor approximates one to five pockets.

The above discussion of "Ball and Wheel Initial Speed Control" hardware is but one embodiment. Other ways of players interaction to determine initial ball and wheel speed are possible.

REPRESENTATION OF ROULETTE SELECTION LAYOUT 4

Figure 4:
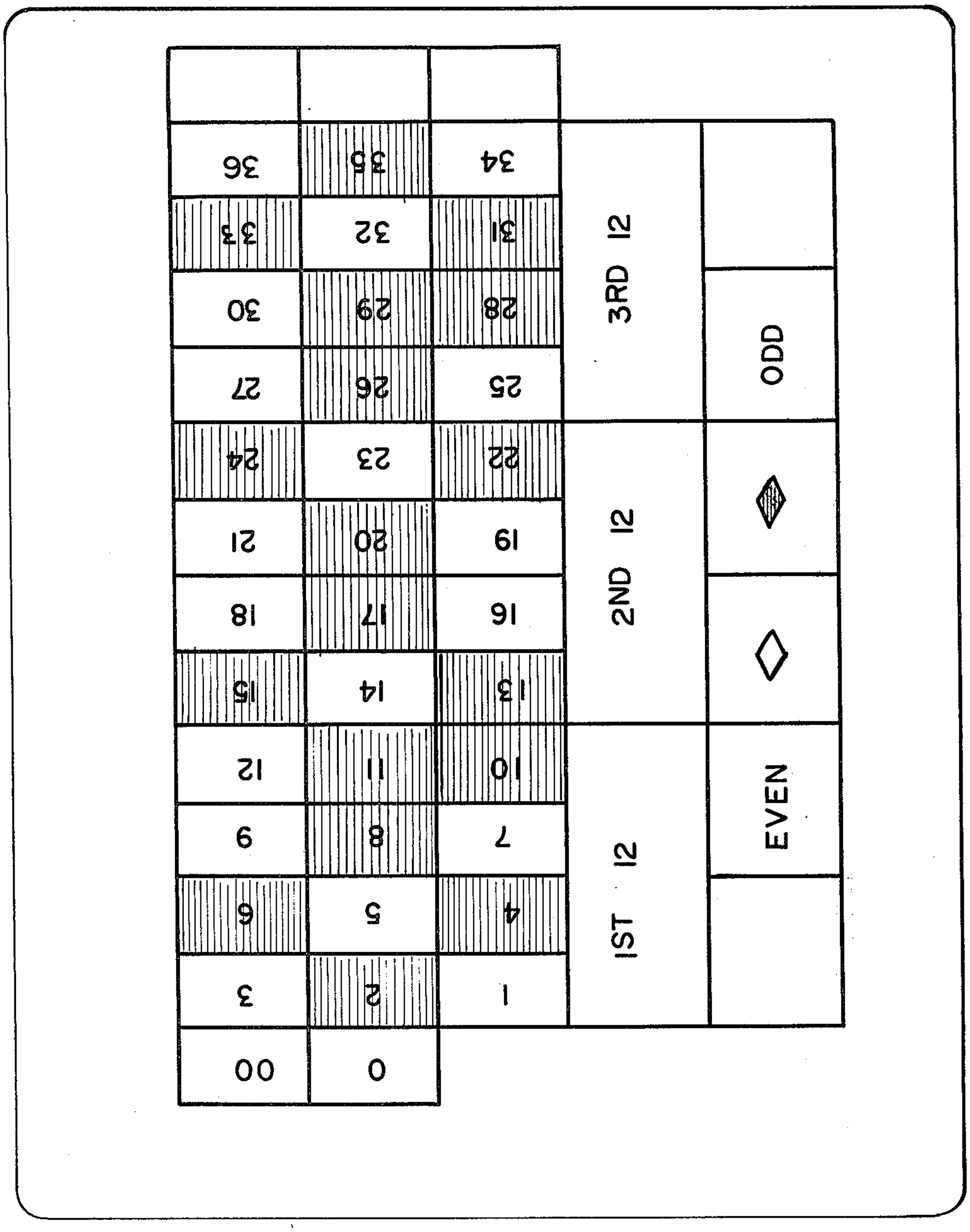
FIG. 4 is an enlarged view of the selection layout portion of FIG. 1.

FIG. 4 shows an expanded view of the roulette number selection layout 4 of FIG. 1 located directly in front of the player. Its purpose is to show what selections are made on what numbers. Each possible selection position is fitted with a numeric LED readout which show the number of times the number has been selected. Its function is to also light the winning number, winning color, and any other winning such as odd/even, 1st 125, etc.

REPRESENTATION OF ROULETTE SELECTION LAYOUT 5

Another representation of the number selection 5 (FIG. 1) is located on a panel below the 1st selection surface 4. This panel is fitted with a switch for every selection position allowed. The player then presses a switch associated with his selection to record the fact that a particular selection has been made on the corresponding number or numbers. Any switch may be pressed any number of times up to the limit imposed by the number of selection units the player has deposited into the slot 8.

MESSAGE PANEL 6

During the normal game sequence, messages may be required to give instructions to the players, either by recorded voice or displayed message. The message panel 6 can do this in a variety of ways known in the art. Some examples of messages are:

1. Insert coins for next game
2. Automatic wheel and ball spin
3. Spin ball again
4. Spin wheel again
5. Ball spun in wrong direction/wheel spun in wrong direction
6. Select again
7. Amount of time left to selection
8. Total selection amount of selection units
9. Number of selections remaining to make
10. Bonus odds upon winning

CONTROL PANEL 7

During the normal game sequence, some control may have to be effected by the player. Some examples of player control functions are as follows:

1. Select automatic wheel/ball spin
2. Select player wheel/ball spin
3. Stop ball
4. Stop wheel

SELECTION UNIT SLOT 8

A selection unit slot 8 is provided.

BONUS SLOT 9

A bonus slot 9 is provided similar to other gaming devices for bonuses.

EXPLANATION OF BLOCK DIAGRAM

Figure 5:
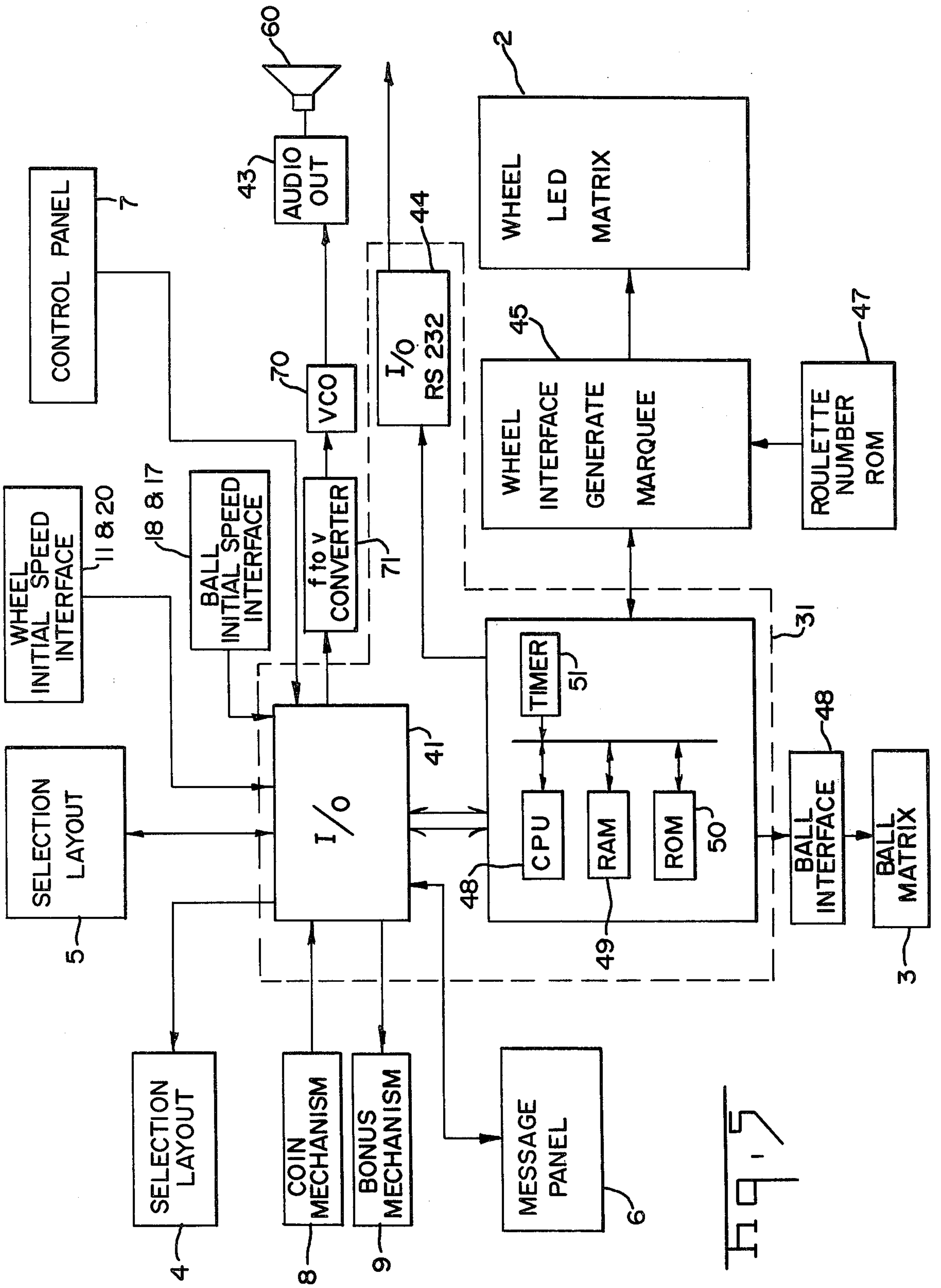
FIG. 5 is a block diagram of the electronic circuit which controls the game elements in accordance with the present invention.

The block diagram for the game and game computer 31 is shown in FIG. 5. The game computer 31 has CPU 48, RAM 49 and ROM 50 and real time timer 51 connected as known in the art. The program for the game is stored in ROM 50. The timer 51 is used to time the ball and wheel display. It is also used to measure the time required to know the initial speed of the wheel and ball. The microcomputer 31 has two I/O modules 41 and 44 associated therewith. One I/O 44 performs the Input/Output for a separate microcomputer via a RS-232 port. This separate microcomputer is used to keep records of all game transactions. The other I/O section 41 provides interfacing to both selection layouts 4 and 5, the ball and wheel speed source/detectors 18, 19, 11, 20, message panel 6, control panel 7 and audio circuits 43, selection unit mechanisms 8 and bonus mechanisms 9.

The microcomputer 31 is connected to a wheel interface 45 and a ball interface 48. The wheel interface generates the roulette number codes that drive the wheel LED matrix 2. The roulette number pattern is stored in roulette ROM 47. Under control of the microcomputer 31, the number pattern is moved in "marquee" fashion.

The ball interface 48 and ball matrix 3 are connected to the microcomputer 31 as shown.

The audio output 43 provides a sound via speaker 60 which simulates the sound of a spinning ball in a race, the sound frequency indicating a slowing of ball speed, in accordance with the above noted ball speed equations.

The computer 31 is always calculating the position of the ball 3 and the wheel 2 from equations (1), (2) and (3). Whenever the computer 31 determines that the next light 17 should be lit for ball 3, the next light 17 will be energized via computer 31, ball interface 48 and ball matrix 3. In the case of the wheel 2, the computer determines the position of the wheel by lighting banks of LEDs corresponding to a particular number sequentially as previously described with reference to FIGS. 2 and 3. The banks of LEDs 12 are controlled via computer 31 through wheel interface 45 and wheel LED matrix 2. The ROM 47 is addressed by computer 31 through interface 45 to provide each consecutive sector 12 with the appropriate code to light up the desired character in matrix 16 at the proper time. It is clear that the time period between lighting of consecutive bulbs 17 and consecutive sectors 12 will gradually increase under control of computer 31 via the algorithms therein to simulate ball and wheel speed decrease with time.

The frequency of the audio output from element 43 and speaker 60 gradually decreases in accordance with the deceleration of the ball 3. This is accomplished by obtaining pulses from the ball interface 48 or computer 31 based upon the algorithms representing ball speed. The frequency of these pulses will decrease with time and these pulses will control the output frequency of a voltage controlled oscillator (VCO) 70 which is controlled by a frequency to voltage converter 71. The output of the VCO 70 will be a signal of gradually decreasing frequency which will control the audio output.

The sound output can be made even more realistic by providing a "wow" therein. This is accomplished by amplitude modulating the signal within audio output circuit 43. The period of the modulations is a function of the angular velocity of the ball 3.

SOFTWARE FLOW DIAGRAM

Figure 6A:
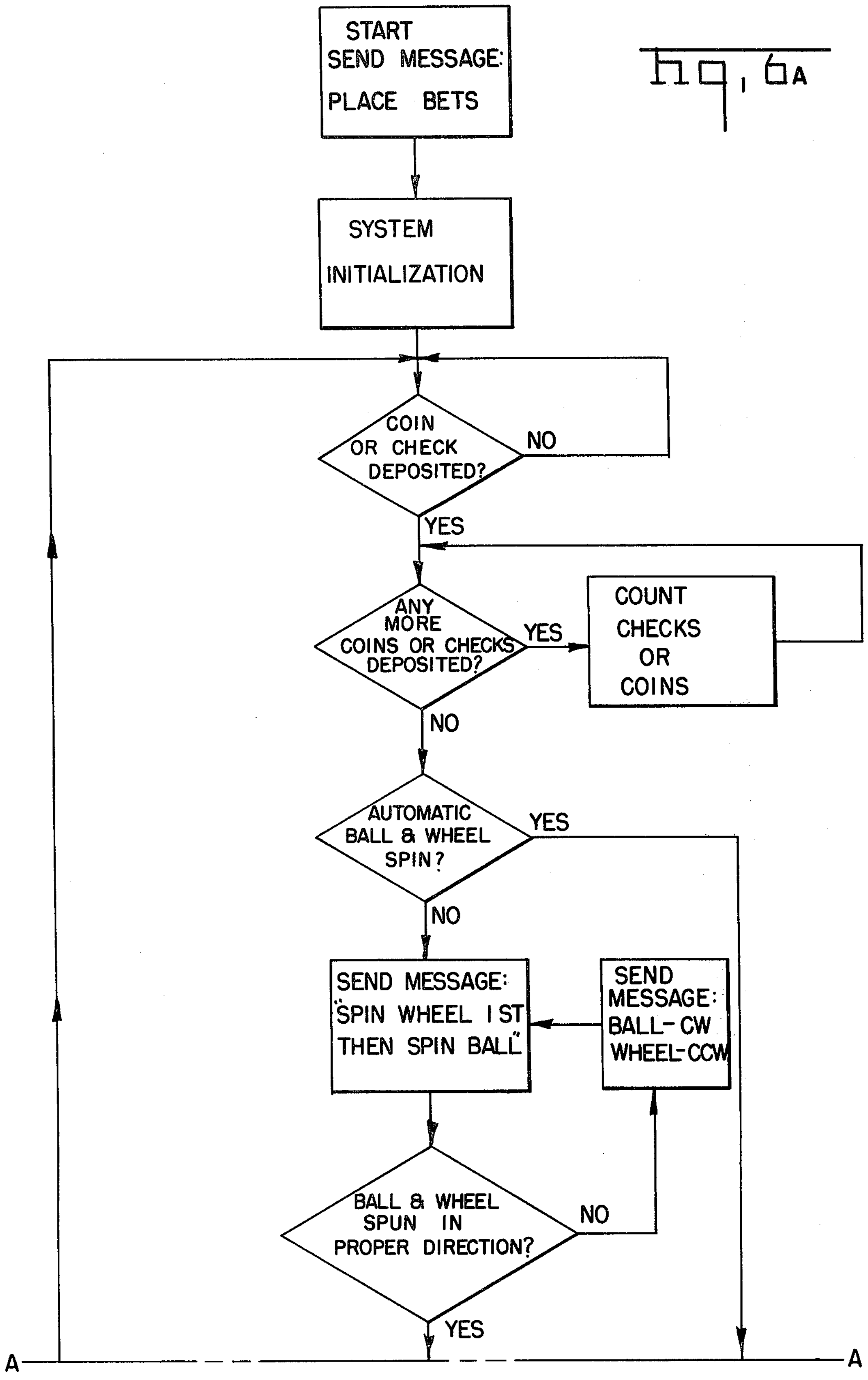
FIGS. 6A, 6B and 6C are a software flow chart to indicate the operation of a computer 31 of FIG. 5.
Figure 6B:
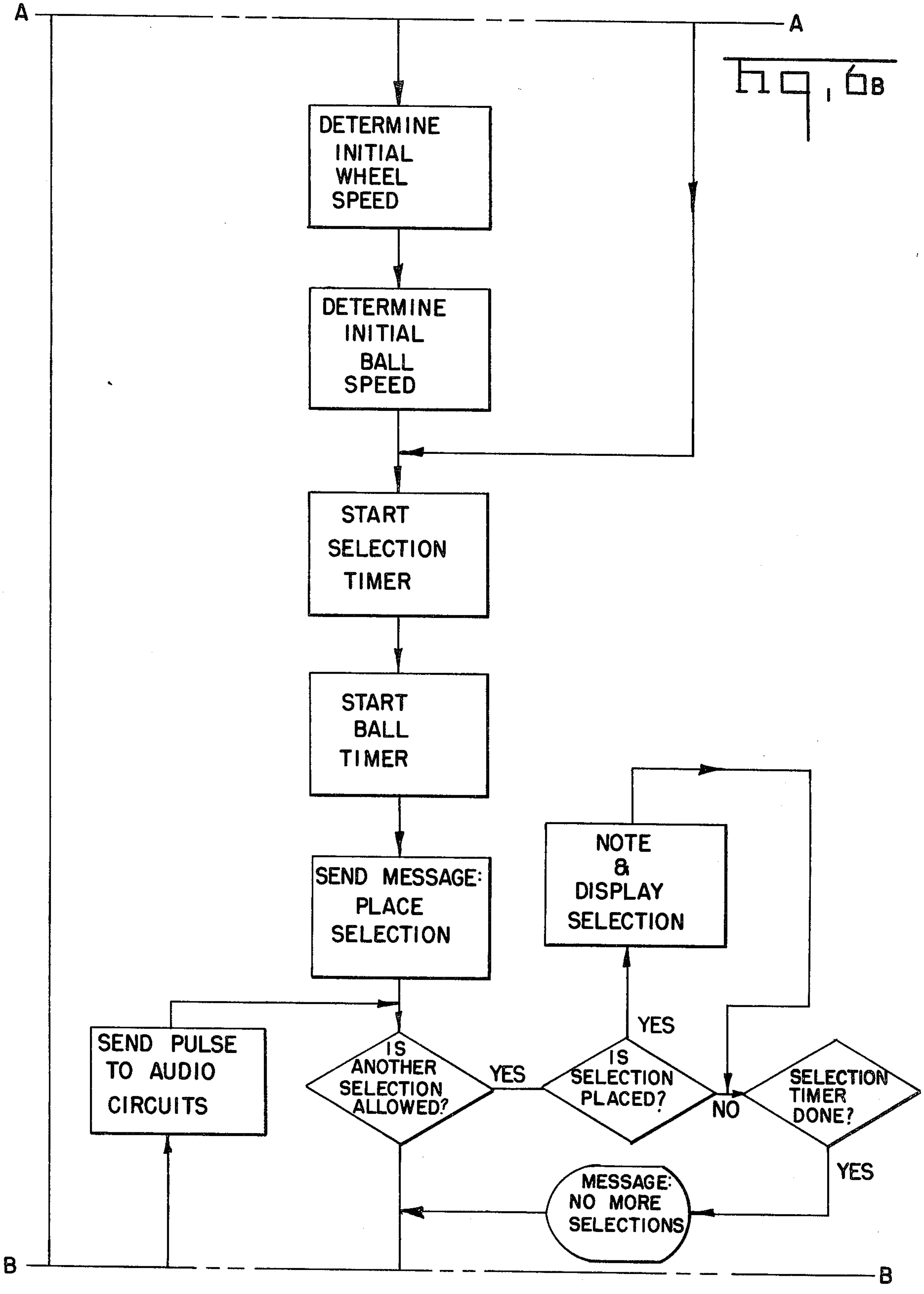
Figure 6C:
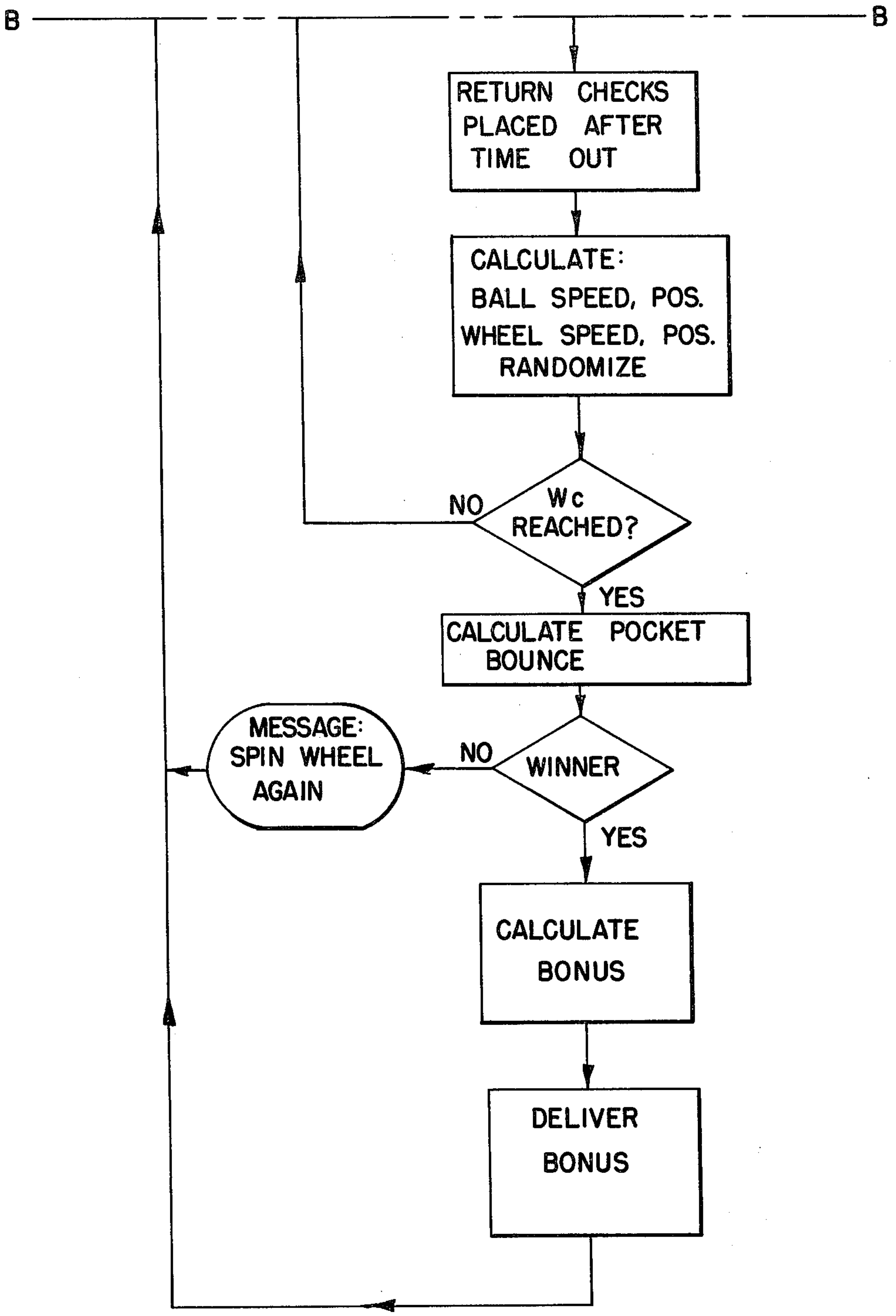

FIGS. 6A–6C constitute flow chart setting forth the performance steps provided by the program stored in the ROM 50.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. An electronic game comprising, (a) a first plurality of light emitting members arranged in a circle, (b) a second plurality of light emitting devices arranged in substantially matrix formation to form an annulus within said first plurality of members and arranged in sectors, and (c) control means selectively operating individual ones of said first plurality of light emitting members consecutively in a first direction at a calculated initial rate and calculated decreasing rate thereafter and each of said sectors of said second plurality of light emitting devices consecutively in a direction opposite to the direction of said first plurality of members.

2. An electronic game as set forth in claim 1 wherein the color of light emitting from said first plurality of light emitting members is different from the color of light emitting from said second plurality of light emitting devices.

3. An electronic game as set forth in claim 2 wherein predetermined ones of said members in each of said sectors are controllable by said control means to provide a color different from the other members in said sector.

4. An electronic game as set forth in claim 3 wherein the rate of selective operation of said first plurality of elements and the rate of selective operation from sector to sector of said second plurality of elements is controllably and randomly variable.

5. An electronic game as set forth in claim 4 wherein said elements of said second plurality of devices are controllable by said control means to provide three different light emitting states.

6. An electronic game as set forth in claim 5, said control means further including means responsive to a predetermined algorithm to controllably decrease the rate of selective operation of said plurality of elements.

7. An electronic game as set forth in claim 6 further including sound producing means controlled by said control means for producing a sound of gradually decreasing frequency corresponding to the decrease in rate of selective operation of said first plurality of elements.

8. An electronic game as set forth in claim 5, said control means further including means responsive to a predetermined algorithm to controllably decrease the rate of selective operation of said second plurality of elements.

9. An electronic game as set forth in claim 8 further including sound producing means controlled by said control means for producing a sound of gradually decreasing frequency corresponding to the decrease in rate of selective operation of said first plurality of elements.

10. An electronic game as set forth in claim 4, said control means further including means responsive to a predetermined algorithm to controllably decrease the rate of selective operation of said first plurality of elements.

11. An electronic game as set forth in claim 4, said control means further including means responsive to a predetermined algorithm to controllably decrease the rate of selective operation of said second plurality of elements.

12. An electronic game as set forth in claim 2 wherein the rate of selective operation of said first plurality of light emitting members and the rate of selective operation from the sector to sector of said second plurality of light emitting devices is controllably and randomly variable.

13. An electronic game as set forth in claim 12 wherein said elements of said second plurality of devices are controllable by said control means to provide three different light emitting states.

14. An electronic game as set forth in claim 13, said control means further including means responsive to a predetermined algorithm to controllably decrease the rate of selective operation of said first plurality of elements.

15. An electronic game as set forth in claim 13, said control means further including means responsive to a predetermined algorithm to controllably decrease the rate of selective operation of said second plurality of elements.

16. An electronic game as set forth in claim 12, said control means further including means responsive to a predetermined algorithm to controllably decrease the rate of selective operation of said first plurality of elements.

17. An electronic game as set forth in claim 16, said control means further including means responsive to a predetermined algorithm to controllably decrease the rate of selective operation of said second plurality of elements.

18. An electronic game as set forth in claim 17 further including sound producing means controlled by said control means for producing a sound of gradually decreasing frequency corresponding to the decrease in rate of selective operation of said first plurality of elements.

19. An electronic game as set forth in claim 16 further including sound producing means controlled by said control means for producing a sound of gradually decreasing frequency corresponding to the decrease in rate of selective operation of said first plurality of elements.

* * * * *